Oct. 13, 1936.   J. H. BLANKENBUEHLER   2,057,471
DYNAMO-ELECTRIC MACHINE
Filed Aug. 15, 1935
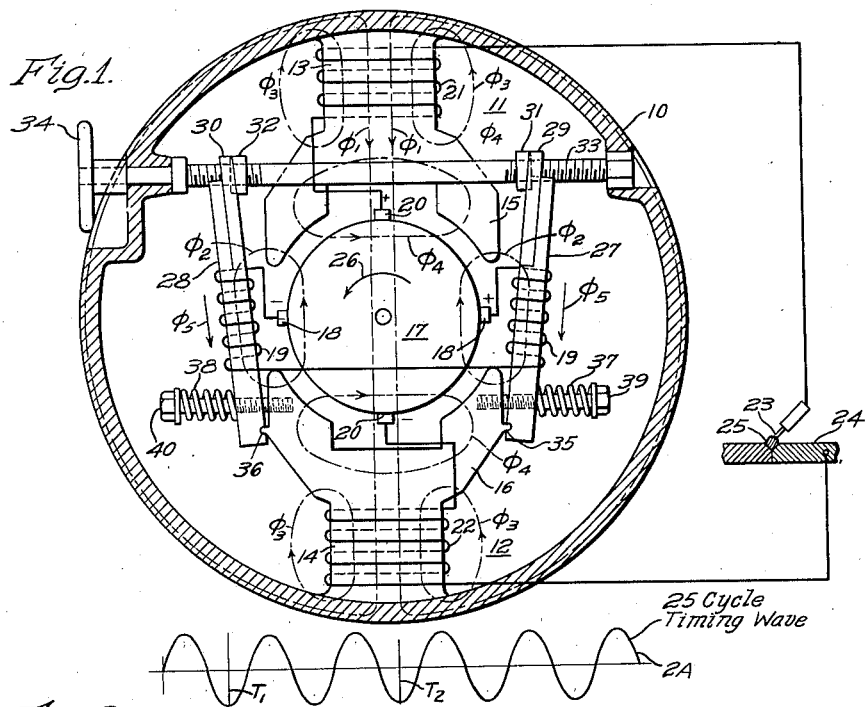
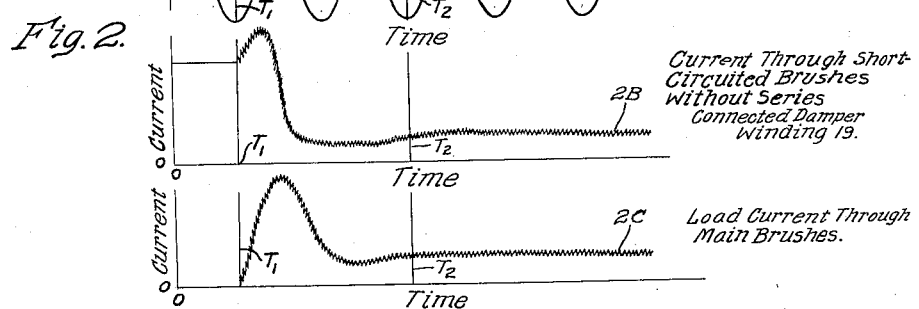
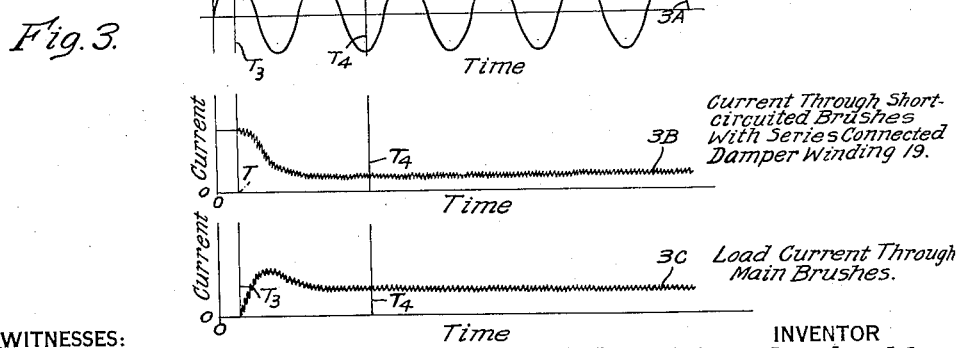
WITNESSES:
INVENTOR
John H. Blankenbuehler.
BY
ATTORNEY Patented Oct. 13, 1936

2,057,471

UNITED STATES PATENT OFFICE 2,057,471

DYNAMO-ELECTRIC MACHINE

John H. Blankenbuehler, Edgewood, Pa., assignor to Westinghouse Electric & Manufacturing Company, East Pittsburgh, Pa., a corporation of Pennsylvania Application August 15, 1935, Serial No. 36,319

19 Claims. (Cl. 171—227)

My invention relates, generally, to dynamo-electric machines, and it has particular relation to dynamo-electric machines of the cross-field type, which are suitable for use in arc welding.

In experimenting with a dynamo-electric machine of the type disclosed in my Patent No. 1,979,665, issued November 6, 1934, and assigned to the assignee of this application, I have discovered that, under certain conditions, the load current does not reach its final steady state condition as quickly as may become desirable in certain instances. When the machine is employed as an arc welding generator there may be some difficulty encountered in striking and maintaining the welding arc since, on initiating the flow of current in the load circuit, there is a tendency for the load current to increase to a value somewhat beyond the final steady state value. Therefore, there is a possibility that some time may be lost in initiating the welding operation, and unstable operation may be encountered while the welding operation is being performed and the load current is changing from one value to another.

It is, therefore, an object of my invention, generally stated, to provide an improved dynamo-electric machine suitable for arc welding, which shall be simple and efficient in operation and which may be readily and economically manufactured and controlled.

The principal object of my invention is to so construct a dynamo-electric generator of the cross-field type that its output will reach the steady state condition in a minimum of time.

An important object of my invention is to reduce the effects of transient phenomena in a dynamo-electric generator of the cross-field type to a minimum.

Another important object of my invention is to reduce the losses and increase the efficiency of a dynamo-electric machine of the cross-field type.

Still another object of my invention is to provide a dynamo-electric generator of the cross-field type having adjustable magnetic shunts for varying the effect of armature reaction to regulate its output, with one or more damper windings connected across the auxiliary brushes of the armature in such manner as to affect the rate of change of armature reaction flux in the magnetic shunts.

Other objects of my invention will, in part, be obvious and, in part, appear hereinafter.

My invention, accordingly, is disclosed in the embodiment hereof shown in the accompanying drawing and comprises the features of construction, combination of elements and arrangement of parts, which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which:

Figure 1 illustrates, diagrammatically, a concrete embodiment of my invention; and Figs. 2 and 3 show a number of oscillographic curves, which demonstrate the operating characteristics of a dynamo-electric machine of the cross-field type constructed in accordance with this invention.

As stated hereinbefore, when a dynamo-electric machine of the cross-field type is constructed as set forth in my patent, there is a possibility that the speed of response will not always be as rapid as is desired. It is desirable to increase the rate of change of the armature reaction flux which opposes the main flux so that it will change at the same rate or at a faster rate than the main flux changes. In order to provide the desired change in the armature reaction flux, I have discovered that the short-circuited turns around the magnetic shunts may be replaced by a winding comprising several turns of insulated conductor, and that if these windings, which may be termed damper windings, are connected in series circuit relation and across the auxiliary brushes, or what are normally termed the short-circuited brushes of a generator of this type, the desired change in the armature reaction flux will be obtained. The current flowing through the auxiliary brushes then flows through the damper windings, which are disposed on the magnetic shunts and which are employed for regulating the output of the machine. The damper windings are so connected that the current flowing therethrough from the auxiliary brushes generates a flux which, in a sense, is in the same direction as the armature reaction flux of the generator, which flux is generated by current flowing through the main brushes and which current is normally termed the load current. By means of the curves shown in Figs. 2 and 3, the difference in operating characteristics with and without the damper windings connected across the auxiliary brushes is clearly demonstrated.

Referring now particularly to Fig. 1 of the drawing, the reference character 10 designates the frame of a dynamo-electric machine of the cross-field type having a pair of inwardly projecting poles 11 and 12. Each of the poles 11 and 12 comprises respectively pole bodies 13 and 14, and pole shoes 15 and 16. Since the major portion of the flux in a machine of this type exists only in the pole shoes 15 and 16, they are illustrated as having a relatively large section to permit the flow of flux therethrough in accordance with standard practice.

An armature 17 is disposed between the poles 11 and 12 and mounted for rotation in any suitable and well known manner. The armature 17 is provided with auxiliary brushes 18—18, which have connected thereacross damper windings 19. At right angles to the plane of the brushes 18—18, a pair of main brushes 20—20 is provided, which may be connected in series circuit relation with series field windings 21 and 22, which are disposed around the pole bodies 13 and 14, respectively. The remaining terminals of the series field windings 21 and 22 may be connected, as illustrated, to a load such as may be constituted by a welding electrode 23 and work 24 between which an arc 25 is to be maintained to perform the welding operation.

The flux which is generated by means of the series field windings 21 and 22, on flow of current therethrough, may be illustrated by the broken lines $\phi_1$, representing the main flux, and by the broken lines $\phi_3$, which represent the leakage flux. No attempt will be made to accurately illustrate the relative flux densities throughout the various magnetic circuits of the machine or to show flux concentrations, which it is understood will, of course, occur.

When the armature 17 is rotated in the direction indicated by the arrow 26, its conductors cutting the main flux $\phi_1$ cause a current to flow through the damper windings 19 between the auxiliary brushes 18—18 and, as a result, a cross flux, which may be represented by the broken lines $\phi_4$, is generated by the armature conductors. It will be understood that the cross flux $\phi_4$ constitutes the major portion of the flux in a machine of this type, and it is for this reason that the pole shoes 15 and 16 are constructed of relatively large size to provide paths having relatively low reluctance for this flux.

As a result of the conductors of the armature 17 cutting the flux $\phi_4$, a potential is generated between the main brushes 20—20 and welding current is caused to flow therethrough to maintain the welding arc 25. The flow of load or welding current generates an armature reaction flux, which may be represented by the broken lines $\phi_2$. As shown, the armature reaction flux $\phi_2$ is opposite in direction to the main flux $\phi_1$, and it is the combination of these two fluxes which provides a differential compounding characteristic in a dynamo-electric machine of the cross-field type.

In order to regulate the output of the machine, the effect of the armature reaction flux $\phi_2$ is varied by altering the reluctance of its path. For this purpose, adjustable magnetic shunts 27 and 28 are provided adjacent the auxiliary brushes 18—18 for bridging the tips of the pole shoes 15 and 16. Each of the shunts 27 and 28 is provided, respectively, with arms 29 and 30, which are arranged to be operated upon by means of nuts 31 and 32 that are mounted on an adjusting rod 33, and which may be turned by means of a handwheel 34. The ends of the adjusting rod 33 are oppositely threaded so that, on rotation of the handwheel 34, the nuts 31 and 32 will either be moved toward or away from each other, depending upon the direction of rotation of the adjusting rod 33 to effect a corresponding movement of the magnetic shunts 27 and 28. As illustrated, the magnetic shunts 27 and 28 are hinged, respectively, at 35 and 36, and by means of springs 37 and 38 cooperating with bolts 39 and 40, the lower ends of the magnetic shunts 27 and 28 are retained in position and normally biased inwardly toward the armature 17.

As illustrated, the damper windings 19 are disposed around the magnetic shunts 27 and 28 and are connected in series circuit relation across the auxiliary brushes 18—18. The damper windings 19 may comprise a number of turns of insulated conductor and they are so connected that on flow of current therethrough a flux is generated which may be represented by the arrows $\phi_5$. It will be observed that the flux represented by the arrows $\phi_5$ is in the same direction as flux $\phi_2$ which is produced by the flow of load current through the main brushes 20—20 of the armature 17.

When the damper windings 19 are not employed and the magnetic shunts 27 and 28 are provided with the short-circuited turns illustrated in my patent, mentioned hereinbefore, the operating characteristics of the machine are demonstrated by the oscillograms shown in Fig. 2 of the drawing. In this figure, the sine wave 2A represents a 25-cycle timing wave. The current flowing through the brushes 18—18 when they are directly short circuited is represented by the curve 2B, units of time being plotted as abscissae and units of current being plotted as ordinates. The corresponding curve showing the flow of load current is represented by the curve 2C, which is plotted to the same units as curve 2B.

It will be observed that at time $T_1$ when the load circuit is completed, the current flowing through the auxiliary brushes 18—18 is relatively high, and further, that at this time, the current flow therethrough increases. The current flowing through the main brushes 20—20 correspondingly increases, as represented by the curve 2C, to a value which is considerably in excess of the final steady state value. The current flowing through auxiliary brushes 18—18 then decreases due to the differential effect caused by the armature reaction flux $\phi_2$, and the load current represented by the curve 2C correspondingly decreases. The current flowing through the auxiliary and main brushes then continues to decrease until finally at time $T_2$ it has reached the steady state value.

When the damper windings 19 are provided and connected across the auxiliary brushes 18—18, the operating characteristics of the machine are as demonstrated by the curves shown in Fig. 3 of the drawing. In this figure, the curve 3A represents a 25-cycle timing wave. The curve 3B represents the current flowing windings 19 and the curve 3C represents the current flowing through the main brushes 20—20. The curves 3A, 3B and 3C are plotted to the same units as the corresponding curves 2A, 2B and 2C of Fig. 2.

It will be observed that at time $T_3$ the value of the current flowing through the auxiliary brushes 18—18 is considerably below the value of the current which flows through these same brushes when the damper windings 19 are not employed. There is, accordingly, a decrease in the losses of the machine and a corresponding increase in efficiency. The decrease in current flowing through the auxiliary brushes is caused by the decrease in effective main flux $\phi_1$, which is reduced by the flux $\phi_5$ generated by the damper windings 19 under no-load conditions.

At the time $T_3$, when the load circuit is completed, there is not a sudden increase in the flow of current through the auxiliary brushes 18—18 as is the case when the damper windings 19 are not connected as set forth herein. The current flowing through the main brushes 20—20, as represented by the curve 3C, correspondingly does not increase to any great extent beyond the final steady state value. At time $T_4$, the load current has arrived at its final steady state value and it will be observed that a considerably less time is required to reach this value when the damper windings 19 are employed and connected as set forth herein than is required when they are omitted. It is, therefore, clear that the damper windings 19, connected across the auxiliary brushes 18—18, provide for materially increasing the speed of response of the generator and further reduce the effect of transient phenomena to a minimum, since the changes in the current flowing through the auxiliary and main brushes are reduced to a minimum.

The explanation of the improved operating characteristics when the damper windings 19 are connected between the auxiliary brushes may be found in a consideration of the relationship existing between the various fluxes when the output circuit of the generator is short circuited to initiate the welding operation. As soon as current is caused to flow through the series field windings 21 and 22, the main flux $\phi_1$ correspondingly increases as well as the leakage flux $\phi_3$. The main flux $\phi_1$ is opposed by the armature reaction flux $\phi_2$. However, due to the fact that the armature reaction flux is generated by the current flowing through the main brushes 20—20, this flux does not change at the desired rate. As a result, the main flux $\phi_1$ increases proportionally at a faster rate than the opposing flux $\phi_2$. As a result, as illustrated by the curves shown in Fig. 2, the current flowing through the auxiliary brushes 18—18 increases beyond its short circuit value and causes a corresponding increase in the load current flowing through the main brushes 20—20. When the current flowing through the auxiliary brushes 18—18 is caused to generate a flux which assists the differential characteristic of the armature reaction flux $\phi_2$ with respect to the main flux $\phi_1$, there is no tendency for the current flowing through the auxiliary brushes 18—18 to increase, and consequently, the current flowing through the main brushes 20—20 into the load circuit does not overshoot or increase beyond, to any great extent, the final steady state value.

Thus when the damper windings 19 are connected between the auxiliary brushes 18—18, current is caused to flow therethrough which generates the flux $\phi_5$ in the same direction as the armature reaction flux $\phi_2$. There is, therefore, an added differential effect relative to the main flux $\phi_1$ which comprises the combination of the armature reaction flux $\phi_2$ and the flux $\phi_5$ generated by the damper windings 19. These two fluxes generate sufficient flux with respect to the main flux $\phi_1$ so that there is slight tendency for the load current to overshoot the final steady state value.

Since certain further changes may be made in the foregoing construction and different embodiments of the invention may be made without departing from the scope thereof, it is intended that all matter set forth in the foregoing description or shown in the accompanying drawing shall be interpreted as illustrative and not in a limiting sense.

I claim as my invention:

1. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, magnetic means disposed to bridge said field poles, and a winding disposed on said magnetic means and connected between said auxiliary brushes.

2. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, movable magnetic means disposed to bridge said field poles, and a damper winding disposed on said movable magnetic means and connected in series circuit relation with said auxiliary brushes.

3. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, magnetic means disposed in the path of the armature reaction flux of the machine, and a winding connected between said auxiliary brushes and disposed to generate flux on flow of current therethrough in said magnetic means in the same direction as the direction of the armature reaction flux.

4. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, movable magnetic means disposed to bridge said field poles for regulating the armature reaction flux of the machine, and a winding disposed on said magnetic means and connected across said auxiliary brushes in such manner as to generate flux on flow of current therethrough in additive relation to the armature reaction flux.

5. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, magnetic means disposed to bridge said field poles, and means comprising a damper winding connected across said auxiliary brushes and disposed on said magnetic means for increasing the rate of change of flux therethrough.

6. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, magnetic means disposed in the path of the armature reaction flux of the machine, and a damper winding connected across said auxiliary brushes and disposed on said magnetic means for increasing the rate of change of armature reaction flux therethrough.

7. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, movable magnetic means disposed in the path of the armature reaction flux of the machine for regulating the output thereof, and a damper winding connected across said auxiliary brushes and disposed on said movable magnetic means for increasing the rate of change of armature reaction flux therethrough.

8. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of members of magnetic material disposed on opposite sides of said armature and between said field poles, and a winding disposed on each of said members and connected across said auxiliary brushes.

9. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable members of magnetic material disposed on opposite sides of said armature and between said field poles, and a damper winding disposed on each of said members and connected in series circuit relation with said auxiliary brushes.

10. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of members of magnetic material disposed in the path of the armature reaction flux on opposite sides of said armature, and a winding individual to each of said members, said windings being connected between said auxiliary brushes and disposed to generate flux in said magnetic members in additive relation to the armature reaction flux.

11. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable magnetic members disposed on opposite sides of said armature for regulating the armature reaction flux of the machine, and a winding disposed on at least one of said members and connected across said auxiliary brushes in such manner as to generate flux on flow of current therethrough in the same direction as the armature reaction flux.

12. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of members of magnetic material disposed to bridge said field poles on opposite sides of said armature, and means comprising a damper winding connected across said auxiliary brushes and individual to each magnetic member for increasing the rate of change of flux therethrough.

13. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of members of magnetic material disposed on opposite sides of said armature in the path of the armature reaction flux, and a damper winding individual to each of said members, said damper windings being connected in series circuit relation across said auxiliary brushes for increasing the rate of change of armature reaction flux in said members.

14. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable members of magnetic material disposed on opposite sides of said armature in the path of the armature reaction flux to permit the regulation of the output of the machine, and a damper winding individual to each of said members, said damper windings being connected across said auxiliary brushes and disposed on said members to increase the rate of change of armature reaction flux therethrough.

15. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable members of magnetic material disposed on opposite sides of said armature and between said field poles, a damper winding disposed on each of said members and connected in series circuit relation with said auxiliary brushes, and means for simultaneously adjusting the positions of said movable magnetic members relative to said field poles for regulating the output of the machine.

16. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable magnetic members disposed on opposite sides of said armature for regulating the armature reaction flux of the machine, a winding disposed on at least one of said members and connected across said auxiliary brushes in such manner as to generate flux on flow of current therethrough in the same direction as the armature reaction flux, and means for simultaneously adjusting the positions of said movable magnetic members relative to said field poles for regulating the output of the machine.

17. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, a pair of movable members of magnetic material disposed on opposite sides of said armature in the path of the armature reaction flux to permit the regulation of the output of the machine, a damper winding individual to each of said members, said damper windings being connected across said auxiliary brushes and disposed on said members to increase the rate of change of armature reaction flux therethrough, and means for simultaneously adjusting the positions of said movable magnetic members relative to said field poles for regulating the output of the machine.

18. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, means for regulating the output of the machine, and means responsive to the flow of current through said auxiliary brushes for generating flux in opposition to the flux generated by said series field winding.

19. A dynamo-electric machine of the cross-field type comprising, in combination, a pair of field poles of opposite polarity, a series field winding disposed on at least one of the field poles, an armature having a pair of main brushes and a pair of auxiliary brushes disposed between said field poles, said main brushes being connected in series circuit relation to said field winding, movable magnetic means disposed in the path of the armature reaction flux of the machine for regulating the output thereof, and means responsive to the flow of current through said auxiliary brushes for generating flux in additive relation to said armature reaction flux.

JOHN H. BLANKENBUEHLER.